(12) United States Patent
Tan et al.

(10) Patent No.: US 11,365,666 B2
(45) Date of Patent: Jun. 21, 2022

(54) GENERATOR AND DOUBLE-SWIRL MIXING DEVICE THEREOF

(71) Applicant: WEICHAI POWER CO., LTD., Shandong (CN)

(72) Inventors: Xuguang Tan, Shandong (CN); Yibao Wang, Shandong (CN); Xiaoli Zhang, Shandong (CN); Fengshuang Wang, Shandong (CN); Dongsheng Wang, Shandong (CN); Hao Zhang, Shandong (CN); Suying Zhang, Shandong (CN); Wei Gao, Shandong (CN)

(73) Assignee: WEICHAI POWER CO., LTD., Shandong (CN)

( * ) Notice: Subject to any disclaimer, the term of this patent is extended or adjusted under 35 U.S.C. 154(b) by 188 days.

(21) Appl. No.: 16/328,322

(22) PCT Filed: Nov. 18, 2016

(86) PCT No.: PCT/CN2016/106360
§ 371 (c)(1),
(2) Date: Feb. 26, 2019

(87) PCT Pub. No.: WO2018/040300
PCT Pub. Date: Mar. 8, 2018

(65) Prior Publication Data
US 2021/0285356 A1    Sep. 16, 2021

(30) Foreign Application Priority Data

Aug. 30, 2016    (JP) .......................... 201610769654.X

(51) Int. Cl.
*F01N 3/28*    (2006.01)
*B01D 53/94*   (2006.01)
(Continued)

(52) U.S. Cl.
CPC ....... *F01N 3/2892* (2013.01); *B01D 53/9431* (2013.01); *B01F 23/2132* (2022.01);
(Continued)

(58) Field of Classification Search
CPC .. F01N 3/2066; F01N 3/2892; F01N 2610/02; B01F 3/04049; B01F 5/0065; B01F 2005/0091; B01D 53/9431
See application file for complete search history.

(56) References Cited

U.S. PATENT DOCUMENTS

| 6,540,046 B1 | 4/2003 | Schuhmacher et al. |
| 10,273,855 B2 | 4/2019 | Noren, IV et al. |

(Continued)

FOREIGN PATENT DOCUMENTS

| CN | 201470307 U | 5/2010 |
| CN | 102027216 A | 4/2011 |

(Continued)

OTHER PUBLICATIONS

EP Extended Search Report corresponding to EP16914862.4 dated Jan. 13, 2020.
(Continued)

*Primary Examiner* — Audrey B. Walter
(74) *Attorney, Agent, or Firm* — Cantor Colburn LLP

(57) ABSTRACT

An engine and a double-swirl mixing device thereof are provided. The double-swirl mixing device includes a mixing tube configured to mix exhaust gas with urea, a tapered mixer including a tapered tube having an outlet end extending into the mixing tube, and a plurality of tapered swirl plates which are arranged along a circumferential direction on a side wall of the tapered tube, and a fan-type blade arranged at the outlet end of the tapered tube, and a diameter of an inlet end of the tapered tube is smaller than a diameter of the outlet end of the tapered tube.

4 Claims, 3 Drawing Sheets

(51) Int. Cl.
    *B01F 23/21*     (2022.01)
    *B01F 25/10*     (2022.01)
    *F01N 3/20*     (2006.01)
    *B01F 23/213*     (2022.01)
    *B01F 25/00*     (2022.01)

(52) U.S. Cl.
    CPC ...... *B01F 25/103* (2022.01); *B01F 2025/931* (2022.01); *F01N 3/2066* (2013.01); *F01N 2610/02* (2013.01)

(56) References Cited

U.S. PATENT DOCUMENTS

| | | |
|---|---|---|
| 2009/0266064 A1 | 10/2009 | Zheng et al. |
| 2013/0167516 A1 | 7/2013 | Loman |
| 2014/0325967 A1 | 11/2014 | Kimura |
| 2015/0040537 A1 | 2/2015 | Hicks et al. |
| 2015/0071826 A1 | 3/2015 | Sampath et al. |
| 2016/0265409 A1* | 9/2016 | Puschel ................. B01D 53/94 |
| 2017/0114693 A1* | 4/2017 | Stelzer ................. B01F 5/0062 |
| 2018/0112571 A1* | 4/2018 | Oohara ................. B01D 53/94 |

FOREIGN PATENT DOCUMENTS

| | | | |
|---|---|---|---|
| CN | 102242661 A | 11/2011 | |
| CN | 103089383 A | 5/2013 | |
| CN | 104024596 A | 9/2014 | |
| CN | 105452626 A | 3/2016 | |
| CN | 105597956 A | 5/2016 | |
| CN | 105804840 A | 7/2016 | |
| DE | 4203807 A1 * | 8/1993 | ......... B01D 53/9431 |
| DE | 102011013335 A1 | 9/2012 | |
| JP | 2008049306 A | 3/2008 | |
| WO | 2012047159 A1 | 4/2012 | |
| WO | WO-2015076765 A1 * | 5/2015 | ............ B01F 5/0451 |
| WO | 2016118720 A1 | 7/2016 | |

OTHER PUBLICATIONS

International Search Report corresponding to Application No. PCT/CN2016/106360; dated Jun. 1, 2017.

* cited by examiner

GENERATOR AND DOUBLE-SWIRL MIXING DEVICE THEREOF

CROSS REFERENCE TO RELATED APPLICATIONS

This is the U.S. national stage of International Application No. PCT/CN2016/106360, filed on Nov. 18, 2016. Priority under 35 U.S.C. § 119(a) and 35 U.S.C. § 365(b) is claimed from Chinese Application No. 201610769654.X, filed on Aug. 30, 2016, the disclosures all of which are also incorporated herein by reference.

FIELD

The present application relates to the technical field of exhaust gas treatment, specifically to an engine and a double-swirl mixing device thereof.

BACKGROUND

Selective catalytic reduction technology (SCR) is a means of preferentially reducing $NO_x$ into $N_2$ with a high selectivity with the aid of a reducing agent such as ammonia, ammonium hydroxide, urea or hydrocarbons under a condition that the oxygen concentration is two orders of magnitudes higher than the $NO_x$ concentration. The function of catalysis is to decrease the activation energy of decomposition reaction so that the reaction temperature can be lowered to a suitable temperature range.

As urea is nontoxic, does not have great influence on the environment and human health, and is convenient for storage and transportation, urea is more suitable to be used as the reducing agent for $NO_x$ in the vehicle SCR system.

Sediments such as urea crystal stone and etc. are easily generated when a diesel vehicle with the SCR system is operating under a low load condition, and this problem is a main factor that effects the stable operation of the vehicle. When the vehicle is running, due to insufficient atomization, uneven mixing or insufficient decomposition of urea, the jetted urea droplet cannot be transformed into $NH_3$ in time, but produces side products, resulting in instable reduction reaction, thereby affecting the uniformity and conversion efficiency of the discharge of $NO_x$.

Thus, how to solve the problems in the conventional technology that urea is apt to deposit, be insufficiently atomized, and be unevenly mixed with the exhaust gas has become an important technical problem to be solved by the person skilled in the art.

SUMMARY

In view of this, an object of the present application is to provide a double-swirl mixing device, which can efficiently avoids the problems that urea is apt to deposit, be insufficiently atomized, and be unevenly mixed with the exhaust gas. The object of the present application is also to provide an engine having the double-swirl mixing device.

A double-swirl mixing device provided by the present application includes:

a mixing tube configured to mix exhaust gas with urea;

a tapered mixer, including a tapered tube having an outlet end extending into the mixing tube, and a plurality of tapered swirl plates which are arranged along a circumferential direction on a side wall of the tapered tube, and a diameter of an inlet end of the tapered tube being smaller than a diameter of the outlet end of the tapered tube; and a fan-type blade arranged at the outlet end of the tapered tube.

Preferably, the number of the fan-type blade is plural and the plurality of fan-type blades are evenly distributed around a center line of the mixing tube.

The present application also provides an engine having the double-swirl mixing device.

In the technical solution provided by the present application, the mixing device includes the tapered swirl plates and the fan-type blades, the fan-type blades have a structure similar to the blade structure of an electric fan in the conventional technology. The function of the tapered swirl plates is to rotate the entered exhaust gas at high speed, to warp and take away the jetted urea. The diameter of the inlet end of the tapered tube is smaller than the diameter of the outlet end of the tapered tube, thus compared with the structure having two ends with equal diameters, in this solution the outlet end of the tapered tube weakens the strength of the rotating airflow, reduces the urea droplets landed at a rear end of a urea mixing tube under the action of the high-speed rotating airflow, and reduces the contact between urea and the wall surface of the urea mixing tube, therefore preventing the generation of the urea crystal. After passing through the outlet end of the tapered mixer, part of the airflow flows through the fan-type blades, which accelerates the flowing and rotating of airflow near the wall surface of the mixing tube, and timely takes away the urea liquid film that is thrown on the wall surface of the mixing tube under the action of strong swirling function of the tapered swirl plates, thereby further lowering the risk of generation of the urea crystal and improving the mixing between urea and airflow.

BRIEF DESCRIPTION OF DRAWINGS

For more clearly illustrating embodiments of the present application or the technical solution in the conventional technology, drawings referred to describe the embodiments or the conventional technology will be briefly described hereinafter. Apparently, the drawings in the following description are only several embodiments of the present application, and for the person skilled in the art other drawings may be obtained based on these drawings without any creative efforts.

Figure 1:
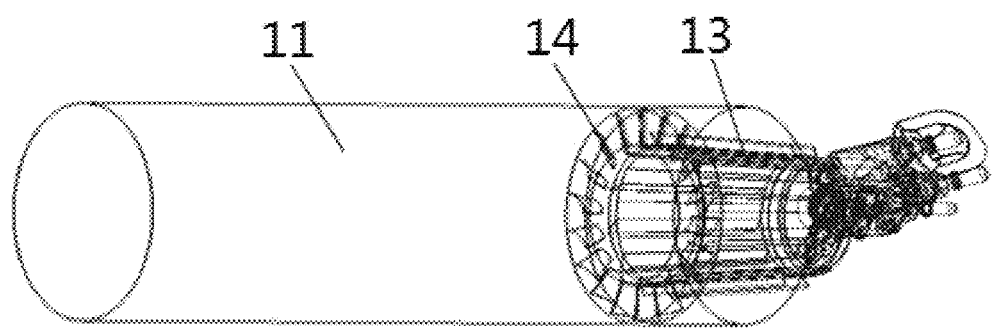
FIG. 1 is an overall view of a double-swirl mixing device according to an embodiment of the present application.
Figure 2:
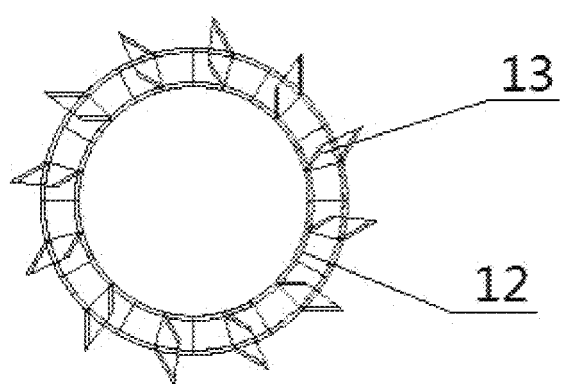
FIG. 2 is a front schematic view of a tapered mixer according to an embodiment of the present application.
Figure 3:
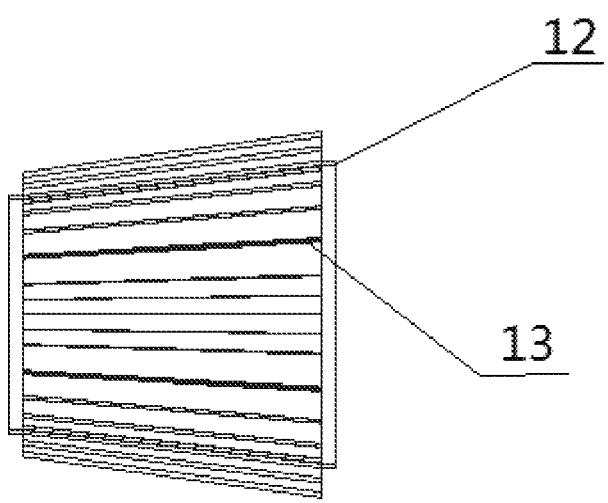
FIG. 3 is a left schematic view of the tapered mixer according to the embodiment of the present application.
Figure 4:
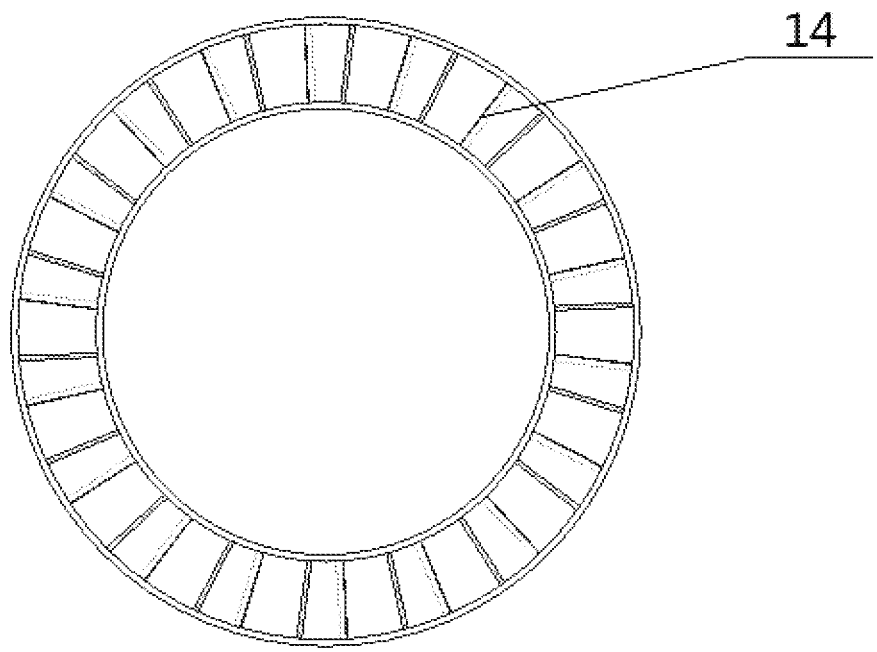
FIG. 4 is a front schematic view of fan-type blades according to an embodiment of the present application.
Figure 5:
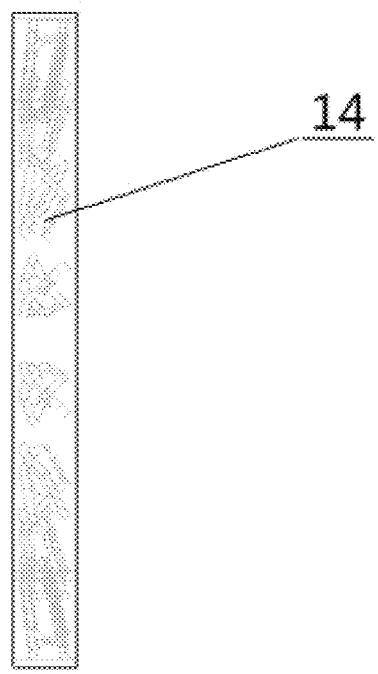
FIG. 5 is a left schematic view of the fan-type blades according to the embodiment of the present application.

Reference numerals in FIG. 1 through FIG. 5:

mixing tube 11,
tapered tube 12,
tapered swirl plate 13,
fan-type blade 14.

DETAILED DESCRIPTION

An object of the embodiments of present application is to provide a double-swirl mixing device, which can efficiently avoids problems that urea is apt to deposit, be insufficiently atomized, and be unevenly mixed with the exhaust gas. The object of the embodiments of the present application is also to provide an engine having the double-swirl mixing device.

The embodiments will be illustrated in conjunction with attached figures hereinafter. Furthermore, the embodiments herein do not limit the present application as set forth in the claims. in addition, the entire contents of the configurations shown in the following embodiments are not limited to necessary contents for the solutions of the present application as set forth in the claims.

Reference is made to FIG. 1 through FIG. 5, a double-swirl mixing device according to this embodiment includes a mixing tube 11, a tapered mixer and fan-type blades 14.

The mixing tube 11 is used to mix the exhaust gas with urea. The tapered mixer includes a tapered tube 12 having an outlet end extending into the mixing tube 11, and multiple tapered swirl plates 13 which are distributed along the circumferential direction on a side wall of the tapered tube 12. The diameter of an inlet end of the tapered tube 12 is smaller than the diameter of the outlet end of the tapered tube 12. The fan-type blades 14 are arranged at the outlet end of the tapered tube 12.

In the technical solution provided by this embodiment, the fan-type blades 14 have a structure similar to the blade structure of an electric fan in the conventional technology. The function of the tapered swirl plates 13 is to rotate the entered exhaust gas at high speed, to warp and take away the jetted urea. The diameter of the inlet end of the tapered tube 12 is smaller Wan the diameter of the outlet end of the tapered tube 12, thus compared with the structure having two ends with equal diameters, in this embodiment the outlet end of the tapered tube 12 weakens the strength of the rotating airflow, reduces the urea droplets landed at a rear end of a urea mixing tube under the action of the high-speed rotating airflow, and reduces the contact between urea and the wall surface of the urea mixing tube 11, therefore preventing the generation of the urea crystal. After passing through the outlet end of the tapered mixer, part of the airflow flows through the fan-type blades 14, which accelerates the flowing and rotating of airflow near the wall surface of the mixing tube 11, and timely takes away the urea liquid film that is thrown on the wall surface of the mixing tube 11 under the action of strong swirling function of the tapered swirl plates, thereby further lowering the risk of generation of the urea crystal and improving the mixing between urea and airflow.

It should be illustrated that for engines of different displacements and uses, the double-swirl mixing device provided by this embodiment can adjust angles, lengths and the number of the tapered swirl plates 13 and the blades of the fan-type blades 14, to realize reasonable distribution of airflow.

An engine is further provided according to this embodiment, which includes the double-swirl mixing device as described in the above embodiment. With such an arrangement, the engine provided by this embodiment has an exhaust gas treatment device that can efficiently avoids problems that urea is apt to deposit, be insufficiently atomized, and be unevenly mixed with the exhaust gas. The derivation process of the beneficial effects is substantially similar to the derivation process of the beneficial effects brought by the double-swirl mixing device, and thus will not be described again herein.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A double-swirl mixing device, comprising:
   a mixing tube configured to mix exhaust gas with urea;
   a tapered mixer, comprising a continually widening tapered tube having an outlet end extending into the mixing tube, and a plurality of tapered swirl plates which are arranged along a circumferential direction on an outside surface of a side wall of the tapered tube, and a diameter of an inlet end of the tapered tube being smaller than a diameter of the outlet end of the tapered tube; and
   a fan blade directly arranged on the outlet end of the tapered tube.

2. The double-swirl mixing device according to claim 1, wherein the number of the fan blade is plural and the plurality of fan blades are evenly distributed around a center line of the mixing tube.

3. An engine, comprising the double-swirl mixing device according to claim 1.

4. An engine, comprising the double-swirl mixing device according to claim 2.

* * * * *